Patented Aug. 23, 1949

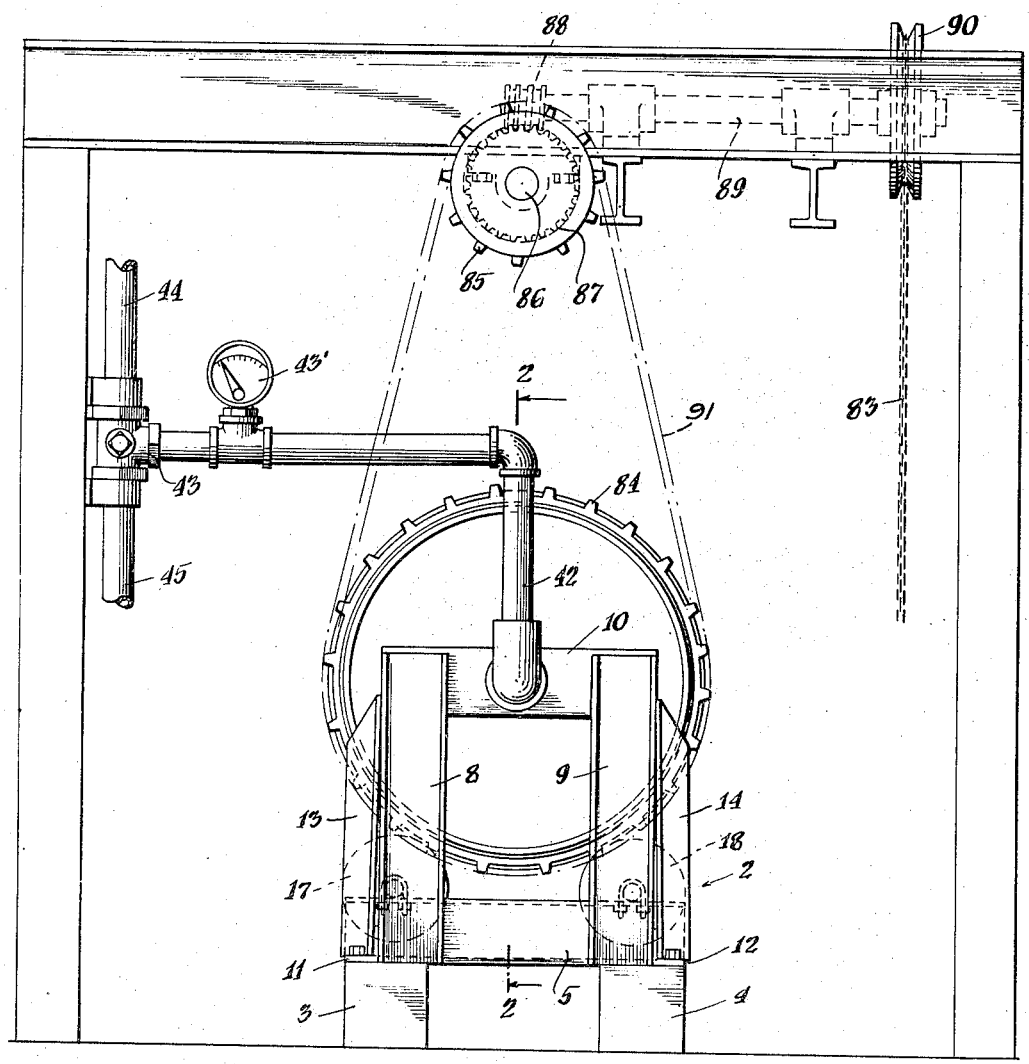

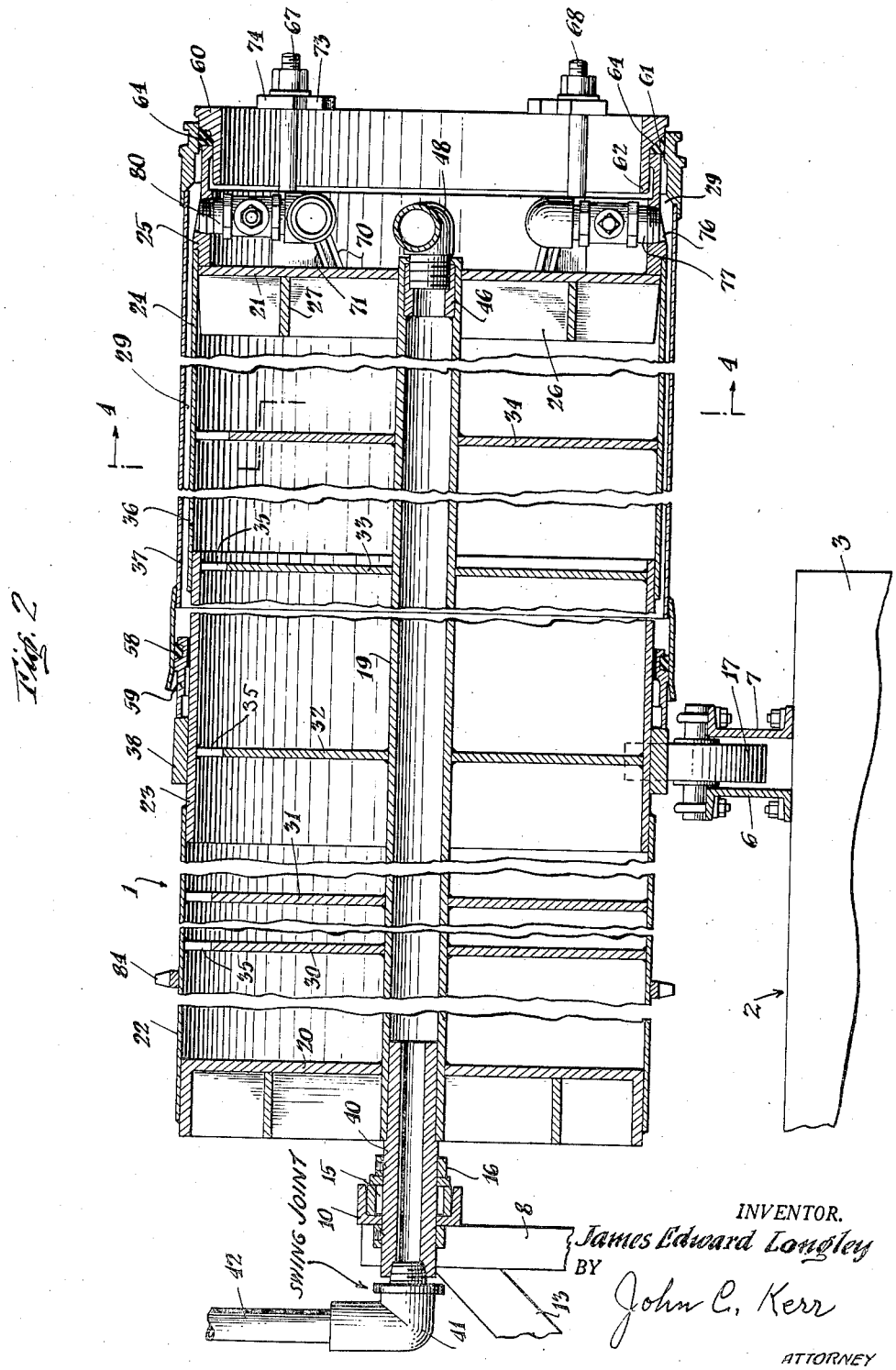

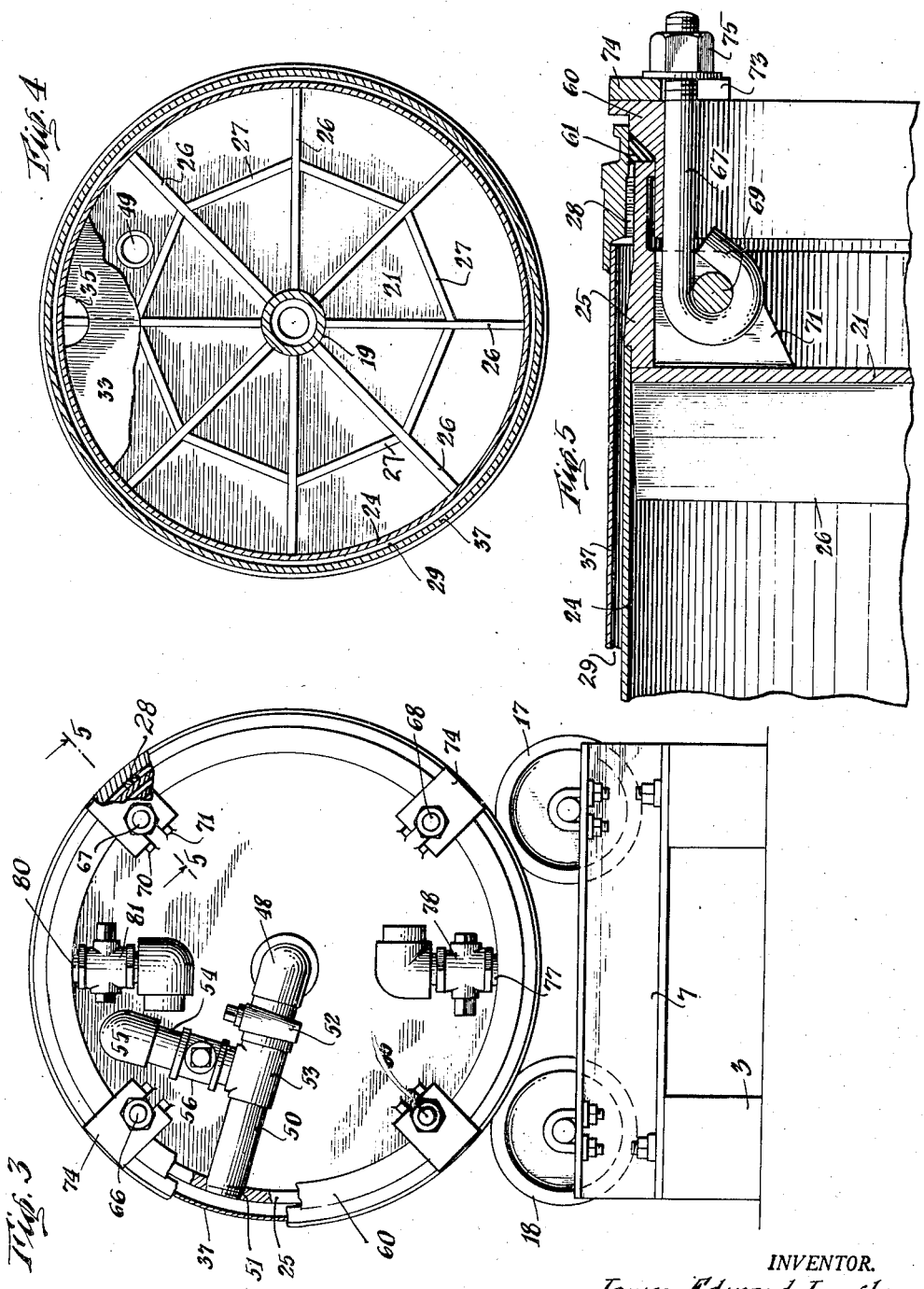

2,479,847

UNITED STATES PATENT OFFICE 2,479,847

APPARATUS FOR TESTING CYLINDERS

James Edward Longley, Verona, N. J., assignor to Lock Joint Pipe Company, East Orange, N. J., a corporation of New Jersey Application January 24, 1945, Serial No. 574,408

13 Claims. (Cl. 73—37)

1

This invention relates to apparatus for testing cylinders, pipes, tubes and other open-ended sleeve-like structures. Among the objects of the invention is a cylinder testing apparatus which enables a cylinder under test to be rotated and all parts of it examined and repaired in accessible and convenient positions.

Another object of the invention is to provide testing apparatus having a core or drum which is fillable with water or other fluid and wherein means are provided for subjecting the fluid in the core to the same testing pressure which is applied to fluid at the outside of the core and within a cylinder being tested, whereby the wall of the core is subjected to the same pressure from within and without, with the result that a relatively light core construction is possible, and the necessity for heavy stiffeners on the inside of the core is dispensed with.

Another object of the invention is to provide a cylinder testing apparatus having provisions for enabling the quick removal and mounting of cylinders and the filling and voiding of a relatively small amount of fluid between successive testing operations.

Another object of the invention is to provide a cylinder testing apparatus whereby fluid pressure can be exerted upon the interior of a cylinder under test, the cylinder inspected, and upon discovery of a leak, the pressure relieved, a small quantity of fluid removed, the leak repaired, and a small quantity of liquid restored to the apparatus and the repaired cylinder re-tested, all without removing the cylinder from the apparatus.

Further and other objects of the present invention will be hereinafter set forth in the accompanying specification and claims and demonstrated by the drawings which show by way of illustration a preferred embodiment and the principle of my invention and what I now consider the best mode in which I have contemplated applying that principle. Other embodiments of the invention employing the same principle may be used and structural changes made as desired by those skilled in the art within the spirit of the appended claims and without departing from the present invention.

Referring to the drawings, Fig. 1 shows an end view of a testing apparatus embodying the present invention as seen from the left of Fig. 2;

Fig. 2 is a longitudinal section through the axis of the rotary drum or core of the testing apparatus and showing a cylinder mounted thereon for testing;

2

Fig. 3 is a view of the testing apparatus as seen from the right of Fig. 2;

Fig. 4 is a section on line 4—4 of Fig. 2;

Fig. 5 is an enlarged section on line 5—5 of Fig. 3 and showing the joint at the unsupported end of the testing apparatus.

The testing apparatus includes a drum or hollow core 1 which is rotatably mounted upon a stationary base 2. The cylindrical wall of the drum is made up of a number of sleeves which are reinforced on the inside by a plurality of bulkheads, but it will be understood that the drum may be built from a single sleeve and with bulkheads only at its ends. This drum is adapted to be filled with fluid under pressure.

The supporting base comprises a pair of timbers 3, 4 which are connected together by channel members 5, 6 and 7, Figs. 1 and 2. Channel member 5 has secured to it two upstanding posts in the form of channel members 8, 9 which are connected at their upper ends by a channel member 10. Angle irons 11 and 12 rest upon and are fastened to timbers 3 and 4, respectively, and extend lengthwise of the timbers away from the end of the apparatus. Braces 13 and 14 are respectively connected at their upper ends to posts 8 and 9 and at their lower ends to the ends of angle irons 11 and 12, thereby forming with these members a pair of triangular side frames standing vertically, one over timber 3 and the other over timber 4.

Horizontal channel member 10 connecting the upper ends of posts 8 and 9 carries a bearing 15, Fig. 2, by which one end of the core 1 is rotatably supported. The bearing is held in place on the shaft which supports the core between channel member 10 and a collar 16 which is keyed to the shaft. The core is also supported intermediate its ends by a pair of rollers 17, 18 which are journalled on bearings supported by channel members 6 and 7 extending between the timbers 3 and 4.

The drum illustrated is designed particularly for testing cylinders having large diameters and of the kind which are commonly used in the construction of high pressure concrete pipe. Its construction is therefore correspondingly strong enough to support and test a cylinder which is required to withstand high internal bursting pressures, but it is clear that the invention may be made use of in apparatus for testing other types of sleeve like structures. For testing smaller-sized pipes and tubes the drum may be made relatively lighter and formed of a single continuous tube-like structure.

At the axis of the drum there is located a pipe 19 which extends through end bulkheads 20 and 21 at the opposite ends of the drum, Fig. 2. The cylindrical wall of the drum consists of a plurality of sleeves 22, 23 and 24 with sleeves 22 and 23 connected together by a weld entirely around their circumference and sleeves 23 and 24 likewise connected together by a welded seam entirely around their circumference. The left end of sleeve 22 is welded to the peripheral flange of bulkhead 20, and the right end of sleeve 24 is welded to bulkhead 21 and to a ring 25 which extends from the bulkhead as a flange. The volume of the drum within its circumferential dimensions as determined by sleeves 22, 23 and 24, outside of pipe 19, and between bulkheads 20 and 21 is made fluid-tight by welded seams at engaging surfaces. This interior volume of the drum is filled with a fluid such as water or air during a testing operation in a manner which will be hereinafter described. The location of supporting rollers 17 and 18 well within the end bulkhead 20 enables the weight of the drum and water to the left of the rollers, Fig. 2, to partially counterbalance the weight of the drum and water at the overhanging portion of the drum.

Owing to the fact that the end bulkheads 20 and 21 are large and are subjected to heavy pressures, they are suitably reinforced by spokes and braces. As shown in Fig. 4, end bulkhead 21 is braced by eight radial members 26 and interconnecting braces 27. Bulkhead 20 is likewise reinforced at its outer side.

The outer side of bulkhead 21 has a flange in the form of a ring 25 which serves as a continuation of the drum at its right end, Figs. 2 and 5.

In Fig. 5 there is shown a bearing bar 28 of a pair of similar bars which are attached to the outer surface of the ring 25, one on each side of the top center line and approximately 45° therefrom for centering the cylinder to be tested on the drum. The annular space 29 outside of the drum terminates at the right end of ring 25.

Within the drum and between its end walls 20 and 21 there is disposed a plurality of bulkheads 30, 31, 32, 33 and 34. Pipe 19 which extends through the center of the drum, is welded to these bulkheads and the bulkheads are likewise connected to the cylindrical wall of the drum at their outer edges. These bulkheads serve to stiffen and support the cylindrical wall of the drum.

An aligned series of holes 35, one in each of the bulkheads 30, 31, 32, 33 and 34, provides openings for permitting fluid contained within the drum to flow into and fill the different compartments or sections which are formed by the interior bulkheads. All of the openings 35 are aligned parallel to the axis of the drum so that in the position of the drum shown in Fig. 2, the several compartments cannot be voided of their contents unless the drum is turned through an angle of 180° and the series of openings 35 are located at the bottom of the drum.

An opening 36 is located in the wall of the drum and in the same diametrical plane as the series of openings 35. When a cylinder, such as 37, is mounted in position for testing, the pressure in the annular space 29 within the cylinder and the pressure interiorly of the drum is equalized through opening 36. It will be appreciated that in the position of the drum illustrated in Fig. 2, with opening 36 uppermost, if the pressure of the liquid is relieved and the cylinder 37 is removed from the apparatus, there can be no draining of the fluid contents of the drum. The drum can be drained through opening 36 when the drum is rotated to place the opening in its lowest position of travel.

The portion of the drum upon which the cylinder is mounted overhangs or extends beyond bearing rollers 18 and 17. These rollers engage the bearing surface of a ring 38 which is attached to the intermediate sleeve 23 of the drum. The left end of the drum is supported by bearing 15 within which hollow shaft 40 is mounted for rotation. This shaft is connected with pipe 19, and its other end is connected with a swing joint 41 by which a fluid supply pipe 42 is connected with the hollow shaft. The joint enables rotation of shaft 40 with respect to the fixed pipe 42. A pressure gauge 43', Fig. 1, is connected in pipe 42, and by means of a three-way valve 43 either air or water can be introduced to pipe 19 at the axis of the drum. Air may be supplied through line 44 or water may be supplied through line 45, depending upon the adjustment of the valve.

Pipe 19 carries a bushing 46 at its discharge end and an elbow 48 having connection with pipe fittings, Fig. 3, by which either water or air may be introduced to the interior of the drum through opening 49, Fig. 4, and to the exterior of the drum through pipe 50 and opening 51, Fig. 3. A valve 52 in the pipe fittings may be used to control the pressure or shut off further flow of fluid from pipe 19 and elbow 48 into the drum and into the space 29 surrounding the drum. A T-connection 53 between elbow 48 and pipe 50 provides for passage to pipe 54 and elbow 55 which has connection with opening 49 in end bulkhead 21. A one-way check valve 56 between T-connection 53 and pipe 54 permits the flow of fluid only towards the interior of the drum.

When the apparatus is to be used for a testing operation, the cylinder to be tested (as shown at 37, Fig. 2), is slipped over the ring 25 at the end of the drum and is advanced over the drum until its forward end is brought into contact and overlies a gasket 58. Gasket 58 is carried by a grooved ring 59 which is fixedly connected to the drum entirely around its circumference. The space 29 between the drum and the cylinder is then closed at its right end by a ring-shaped follower or gland ring 60 and a gasket 61. The follower includes a male portion 62 which slides within ring 25 by which it is temporarily supported. Follower 60 is provided with means in the form of a sloping surface 64 by which the gasket 61 is forced against the end of ring 25 and also against the interior surface of the cylinder.

Gasket 61 seals the annular space 29 at its right end and the compression of the gasket may be increased by advancing follower 60 inwardly of the drum. For supporting and advancing the follower a plurality of eye-bolts such as 65, 66, 67 and 68 are provided. These are individually fastened to pins 69 which extend between lugs, such as 70 and 71, which are fastened to end bulkhead 21. The threaded ends of the eye-bolts extend through slots 73 in lugs 74 which are fastened to the follower 60. By tightening the several nuts 75 for the several eye-bolts the follower compresses gasket 61 into sealing position.

With the cylinder to be tested in place and the annular space 29 sealed at its ends, the apparatus is ready for a testing operation. Water is introduced to the interior of the drum and to the space 29 through conduit 19, the fittings at the end of the drum, Fig. 3, and openings 49 and 51. When the pressure has been built up to the desired amount required for testing, the drum and cylinder may be rotated about their axis and the entire surface of the cylinder examined. If a leak is found the leak may be repaired while the cylinder is on the drum.

If desired, the space 29 may be emptied of water while the repairing is accomplished, and then refilled for further testing. During a repairing operation and also just preliminarily to removing the cylinder from the drum, the annular space 29 may be emptied without voiding the liquid contents of the drum. This is accomplished by first rotating the drum until the series of openings 35 in the bulkheads are uppermost. When this has been done, water in the annular space 29 may be discharged through opening 76 in ring 25, Fig. 2. This opening has a tapped connection with a pipe 77 in which there is a valve 78 which is opened for this purpose. Before opening valve 78, it should be ascertained that valve 52 is closed. In order to permit the flow of fluid through pipe 77, it is necessary to permit air to enter the annular space 29. This is accomplished through a pipe connection 80 which is tapped into the wall of ring 25 at a point diametrically opposite from hole 76, as shown in Figs. 2 and 3. By opening value 81 air is permitted to enter the space 29. This same connection with valve 81 may be used for permitting the outflow of air from within the drum and from the annular space 29 during a filling operation.

Whenever the testing apparatus is not to be used for a long period of time it will prove advantageous to empty the fluid contents of the drum. This may be accomplished by rotating the drum through 180° from the position shown in Fig. 2, and by opening valve 81 which will then be lowermost. In this position the water will flow from within the drum through opening 36.

For facilitating the rotation of the drum and inspection and repair of the cylinder a hand chain 83 and gearing are provided, Fig. 1. This includes a gear wheel 84 mounted on the drum, a spocket chain 91, and another gear wheel 85 mounted on a shaft 86 which is supported overhead. Shaft 86 carries a worm gear 87 which has connection with a worm 88. Worm 88 is operated through shaft 89 and pulley 90 over which hand chain 83 passes.

What is claimed is:

1. In a cylinder tester, the combination comprising a core for supporting a cylinder to be tested, means supporting said core adjacent one end of said core and leaving free a portion of the core adjacent its other end for receiving a cylinder to be tested, said supporting means including bearings for enabling rotary motion of said core, means adjacent the supported end of said core for holding a gasket encircling said core, a ring-shaped follower at the other end of said core, a second gasket intermediate said core and said follower, adjustable means for forcing said second gasket into sealing relationship with said core and a cylinder mounted thereon for testing, said adjustable means being supoprted from said core and adapted to engage said follower, and means whereby fluid pressure may be applied to the interior of a cylinder mounted on said core.

2. In a cylinder tester, the combination comprising a core for supporting a cylinder to be tested, means supporting said core adjacent one end of said core and leaving free a portion of the core adjacent its other end for receiving a cylinder to be tested, said supporting means including bearings for enabling rotary motion of said core, means adjacent the supported end of said core for holding a gasket encircling said core, a gland ring mounted at the other end of said core, a second gasket intermediate said core and said gland ring, adjustable means for forcing said second gasket into sealing relationship with said core and a cylinder mounted thereon for testing, said adjustable means being supported from said core and adapted to engage said gland ring, and conduit means having connection with the space intermediate said gaskets and between said core and a cylinder mounted thereon for introducing fluid to said space.

3. In a cylinder tester, the combination comprising a core, means supporting said core adjacent one end of said core and leaving free a portion of the core adjacent its other end for receiving a cylinder to be tested, said core being hollow and having bulkheads adjacent either end, a pair of circumferential gaskets spaced on said core, a fluid supply conduit, conduit means carried by one of said bulkheads and having means for attachment to said first-named conduit, said conduit means having connection with the space intermediate said gaskets and between said core and a cylinder mounted thereon for testing and also connection with the interior of said core whereby said space and said interior may be filled with fluid, and means for enabling the escape of air from within said core and the space between said core and said cylinder when the same are being filled with fluid.

4. In a cylinder tester, the combination comprising a core, means supporting said core adjacent one end, said supporting means including bearings for enabling rotary motion of said core, said core being hollow and having bulkheads at either end, a pair of circumferential gaskets spaced on said core, a conduit disposed at the axis of said core and extending through one of its bulkheads, conduit means carried by the other of said bulkheads and having connection with said first-named conduit, said conduit means having connection with the space intermediate said gaskets and between said core and a cylinder mounted thereon for testing and also connection with the interior of said core whereby said space and said interior may be filled with fluid, and means for enabling the escape of air from within said core and the space between said core and said cylinder when the same are being filled with fluid.

5. In a cylinder tester, the combination comprising a hollow core, gaskets encircling said core and means cooperating therewith to effect sealing between said core and a cylinder mounted thereon for testing, bulkheads at either end of said core and intermediate the ends of said core, said bulkheads intermediate the ends of said core having openings arranged in alignment proximate the outer wall of said core, the wall of said core having an opening in the same diametrical plane as that of said aligned openings and on the same side of the core as said aligned openings, conduit means for introducing fluid to said core, means rotatably supporting said core, and means for rotating said core so as to locate said aligned openings in said intermediate bulkheads and said opening in the exterior wall of said core lowermost of said core for discharging fluid from said core.

6. In a cylinder tester, the combination comprising a hollow core, gaskets encircling said core and means cooperating therewith to effect sealing between said core and a cylinder mounted thereon for testing, bulkheads at either end of said core and intermediate the ends of said core, said bulkheads intermediate the ends of said core having openings arranged in alignment proximate the outer wall of said core, the wall of said core having an opening in the same diametrical plane as that of said aligned openings and on the same side of the core as said aligned openings, means supporting said core for rotation, said supporting means including a hollow shaft, conduit means connecting the interior of said core with said hollow shaft, and fluid supply means having connection with said hollow shaft.

7. In a cylinder tester, the combination comprising a hollow core, bulkheads at either end of said core and intermediate the ends of said core, said bulkheads intermediate the ends of said core having openings arranged in alignment proximate the outer wall of said core, the wall of said core having an opening in the same diametrical plane as that of said aligned openings and on the same side of the core as said aligned openings, conduit means for introducing fluid to said core, means including gaskets for supporting a cylinder outside of said core for testing and providing a sealed space between said core and the cylinder, conduit means for introducing fluid to said sealed space, valved means carried by said core for subjecting said sealed space to atmospheric pressure, other valved means carried by said core diametrically opposite said first-named valve means for subjecting said sealed space to atmospheric pressure, and means rotatably supporting said core.

8. In a cylinder tester, the combination comprising a hollow core, bulkheads at either end of said core and intermediate the ends of said core, said bulkheads intermediate the ends of said core having openings arranged in alignment proximate the outer wall of said core, the wall of said core having an opening in the same diametrical plane as that of said aligned openings and on the same side of the core as said aligned openings, means including gaskets for supporting a cylinder outside of said core for testing and providing a sealed space between said core and the cylinder, conduit means for introducing fluid to said core and sealed space, said conduit means including pipe fittings having a branch connected with said sealed space and branch connected with the interior of said core, a check valve in said last-named branch, a valve in said conduit means, valve means for subjecting said sealed space to atmospheric pressure, other valve means located diametrically opposite said last-named valve means for subjecting said sealed space to atmospheric pressure, and means including bearing means supporting said core for enabling rotation of said core.

9. In a cylinder tester, the combination comprising a hollow core, a bulkhead enclosing each end of said hollow core, a pipe passing through said hollow core and bulkheads at the axis of said core, a hollow shaft secured to said core at one end thereof and having connection with said pipe, a bearing supporting said hollow shaft, bearings intermediate the ends of said core and together with said first-named bearing rotatably supporting said core, conduit means having connection with said pipe and the interior and exterior of said core, means carried by said core for supporting a cylinder to be tested and for sealing off an annular space between said core and said cylinder, a passageway between the interior of said core and said annular space, valve means for venting said annular space, at will, and means for supplying fluid to said hollow shaft.

10. In a cylinder tester, the combination comprising a rotatable drum, a shaft extending from said drum at one end, a bearing for said shaft, bearing means encircling said drum intermediate its ends, supporting rollers engaging said bearing means, a gasket encircling said drum and located between said bearing means and the free end of said drum, a gland ring carried by said drum at its free end, a second gasket supported by said gland ring and engaging the free end of said drum, means carried by said drum and engaging said gland ring for holding said gland ring and second gasket in gasket-sealing position with said second gasket in sealing relationship with a cylinder to be tested, and means for introducing fluid into an annular space between said drum and the cylinder and said gaskets.

11. In a cylinder tester, the combination comprising a hollow drum, bulkheads closing the ends of said drum, a shaft extending from one of said bulkheads, a bearing for said shaft, bearing means encircling said drum intermediate its ends, supporting rollers engaging said bearing means, a gasket encircling said drum and located between said bearing means and the free end of said drum, a gland ring carried by said drum at its free end, a second gasket supported by said gland ring and engaging the free end of said drum, means supported from the bulkhead nearest the free end of said drum for holding said gland ring in gasket-sealing position, an opening in the wall of said drum intermediate said gaskets, means for introducing fluid into said drum for filling said drum and an annular space between said gaskets exteriorly of said drum and interiorly of a cylinder mounted thereon for testing, and means for venting air from said drum and said annular space.

12. In a cylinder tester, the combination comprising a hollow drum, bulkheads closing the ends of said drum, a shaft extending from one of said bulkheads, a bearing for said shaft, a bearing ring encircling said drum intermediate its ends, supporting rollers engaging said bearing ring, means carried by said drum for sealing an annular space between the drum and a cylinder to be tested, said sealing means and annular space being located beyond said bearing ring towards the free end of said drum, the wall of said drum opposite said annular space being provided with an opening connecting said annular space and the interior of said drum, means for introducing fluid into said drum and annular space, and means for opening said drum and annular space to the atmosphere.

13. Apparatus for testing cylinders under fluid pressure comprising a rotatable drum mounted upon bearings located substantially at its mid-length and adjacent one end, thereby leaving the other end of the drum free and overhanging the bearings, said drum comprising a cylindrical wall and radial walls adjacent to and closing the ends of the cylindrical wall whereby the drum is adapted to contain fluid and the greater weight of the drum and contents is supported upon a bearing located substantially at the mid-center of the length of the drum, a gasket encircling said drum, said gasket being located towards the free end of the drum adjacent said mid-located bearing, a second gasket located adjacent the free end of the drum, means for holding said second gasket in contact with said drum and a cylinder mounted upon the exterior of the drum for testing, conduit means for introducing fluid to the interior of the drum, the cylindrical wall of said drum having an opening intermediate said gaskets for providing for the passage of fluid between the interior of the drum and a space between said gaskets, exteriorly of the drum and interiorly of a cylinder mounted upon said drum for testing, whereby pressure upon the cylindrical wall of the drum is equalized during testing, and a valve connection with the cylindrical wall of the drum located exteriorly of the radial wall of the drum adjacent its free end.

JAMES EDWARD LONGLEY.

REFERENCES CITED

The following references are of record in the file of this patent:

UNITED STATES PATENTS

| Number | Name | Date |
| --- | --- | --- |
| 1,734,805 | Hawthorne | Nov. 5, 1929 |
| 1,972,630 | Neale et al. | Sept. 4, 1934 |
| 2,241,526 | Rosenkranz | May 13, 1941 |

FOREIGN PATENTS

| Number | Country | Date |
| --- | --- | --- |
| 578,083 | Germany | June 9, 1933 |
| 598,160 | Germany | June 6, 1934 |